UNITED STATES PATENT OFFICE.

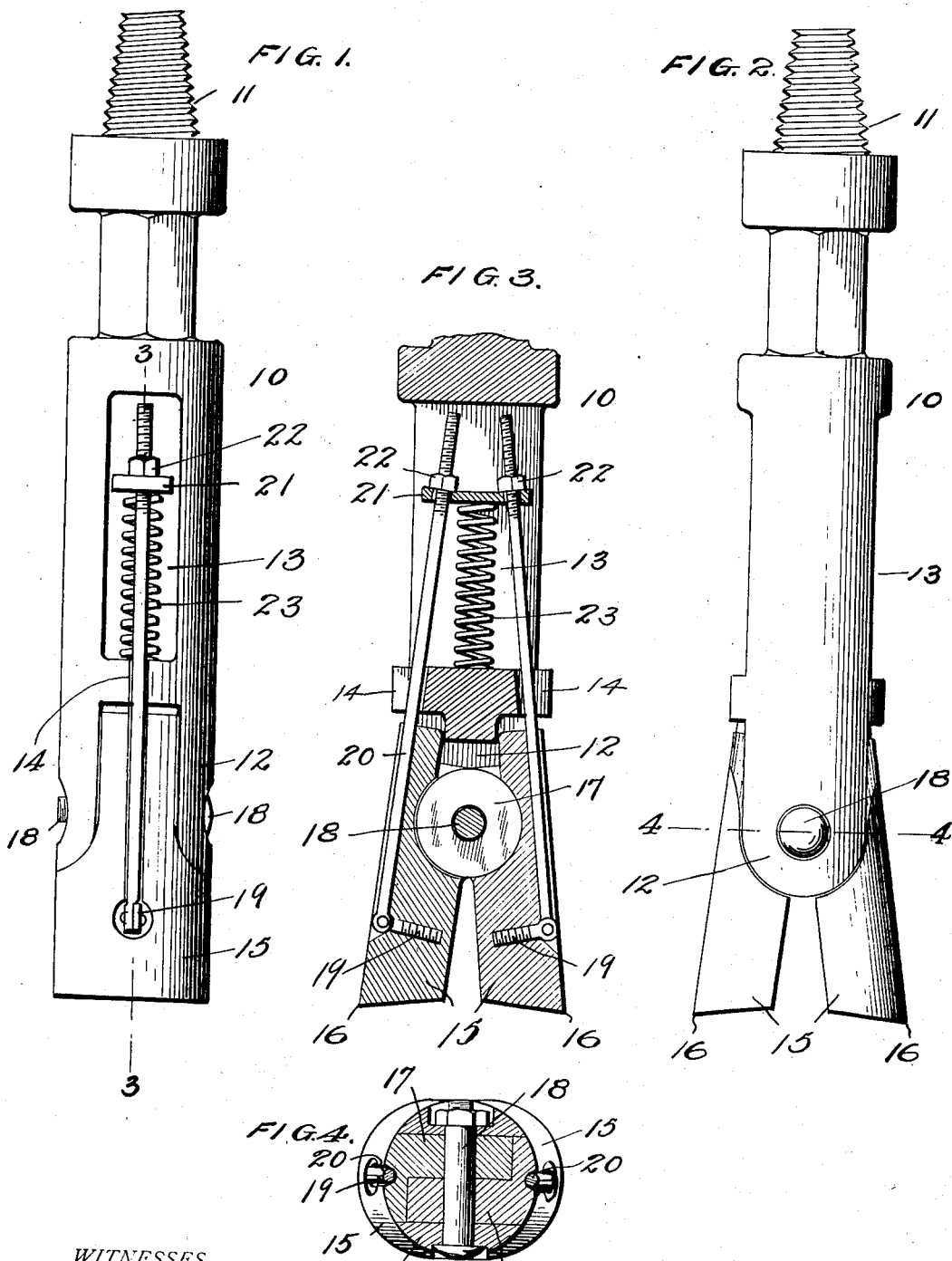

THOMAS B. NEIMAN, OF BEAVER FALLS, PENNSYLVANIA.

DRILL.

985,276.

Specification of Letters Patent.  Patented Feb. 28, 1911.

Application filed June 8, 1910.  Serial No. 565,673.

*To all whom it may concern:*

Be it known that I, THOMAS B. NEIMAN, a citizen of the United States, residing at Beaver Falls, in the county of Beaver and State of Pennsylvania, have invented certain new and useful Improvements in Drills, of which the following is a specification.

My present invention relates generally to drills used in boring for oil or water, my object being to provide a drill especially adapted to cutting away flinty substances projecting into the well opening, particularly those which are apt to cause a deflection of the ordinary drill in its operation.

With this in view, my invention resides in the construction to be hereinafter described with reference to the accompanying drawing, in which, Figures 1 and 2 are elevations, Fig. 3 is a longitudinal section taken on line 3—3 of Fig. 1, and, Fig. 4 is a cross section taken on line 4—4 of Fig. 2.

Referring now to these figures, the shank 10, which may have the usual tapered threaded end 11, is provided at its opposite end with a slot forming end extensions 12. This shank 10 is also provided with an intermediate slotted opening 13 therethrough and with longitudinal side recesses 14 extending between its end slot and opening 13.

The cutters 15, which have cutting edges 16 at one end, are provided with reduced opposite ends having side cheeks 17, these reduced ends being adapted to extend into the end slot of shank 10 between extensions 12, and the cheeks 17 being apertured to receive a bolt 18 therethrough which extends also through apertures in said extensions 12 and forms a pivot for cutters 15 whereby they may be expanded or contracted. These cutters 15 have intermediate transverse openings and longitudinal recesses in their outer surfaces, extending from their reduced ends, said openings receiving eye-bolts 19 which are loosely connected to adjusting rods or bolts 20. The rods or bolts 20 extend within the recesses of said cutters and through the side shank recesses 14 into the intermediate shank opening 13, and are provided with threaded inner ends projecting through openings in an adjusting plate 21. Nuts 22, which engage upon the extremities of rods 20 and bear against the adjusting plate 21, serve in connection with said rods as means to expand the cutters, while a coil spring 23 interposed between the adjusting plate 21 and the end of the shank opening 13 adjacent the extensions 12, serves to elastically support the cutter in the selected degree of expansion.

I claim:

The combination of a shank having an intermediate opening, cutters pivotally connected to said shank to swing toward and away from one another, an adjusting plate within said shank opening, rods connected at one end to said cutters and adjustably connected through said adjusting plate at their opposite ends, and a spring interposed between said adjusting plate and one end of the shank opening.

In testimony whereof I affix my signature in presence of two witnesses.

THOMAS B. NEIMAN.

Witnesses:
 D. F. FUNKHOUSE,
 LOLA M. CRISS.